United States Patent

[11] 3,588,738

| [72] | Inventor | Francis E. Goodwin<br>Malibu, Calif. |
|---|---|---|
| [21] | Appl. No. | 756,779 |
| [22] | Filed | Sept. 3, 1968 |
| [45] | Patented | June 28, 1971 |
| [73] | Assignee | Hughes Aircraft Company<br>Culver City, Calif. |

[54] FREQUENCY STABILIZED LASER
1 Claim, 5 Drawing Figs.

| [52] | U.S. Cl. | 331/94.5 |
|---|---|---|
| [51] | Int. Cl. | H01s 3/02 |
| [50] | Field of Search | 331/94.5;<br>350/160; 250/199 |

[56]    References Cited
UNITED STATES PATENTS

| 3,392,353 | 7/1968 | Miller | 331/94.5 |
|---|---|---|---|
| 3,435,371 | 3/1969 | White | 331/94.5 |
| 3,453,557 | 7/1969 | Polanyi et al. | 331/94.5 |
| 3,457,415 | 7/1969 | Lipsett et al. | 331/94.5 |
| 3,471,804 | 10/1969 | Bridges et al. | 331/94.5 |
| 3,517,330 | 6/1970 | Doyle et al. | 331/94.5 |

OTHER REFERENCES

Doyle et al. " Dual Polarization FM Laser Communications", PROCEEDING OF THE IEEE Vol. 52, p. 1353, 1964.

*Primary Examiner*— William L. Sikes
*Attorneys*— James K. Haskell and John Holtrichter, Jr.

ABSTRACT: The invention is a frequency stabilized laser in which an active laser element and a birefringent plate are disposed within a regenerative cavity in a regenerative path defined between two end reflectors to produce a dual polarized output beam. The active laser element is excited by pump energy and a portion of the laser output beam is diverted by a beam splitter to a Wollaston prism where it is separated according to polarization into two beams. Each of these beams is directed to an optical detector which detects the amplitude of the incident beam at its own particular frequency of oscillation. The amplitudes of the two beams are compared by a comparator that produces an error signal which drives a frequency adjustment element coupled to the laser.

Francis E. Goodwin,
INVENTOR.

Francis E. Goodwin,
INVENTOR.
BY.

ATTORNEY.

Francis E. Goodwin,
INVENTOR.

FREQUENCY STABILIZED LASER

The frequencies of all types of lasers tend to drift due to mechanical, acoustical, and thermal disturbances. When drift occurs, it becomes impossible to perform heterodyne detection using these lasers.

Until recently, the problem of stabilization had been hindered by the lack of an engineering solution to the problem of isolating the laser system from sound, heat, and other mechanical disruptions from the laser's environment. Until these problems were solved, it was difficult to achieve any refinements of present stabilization schemes. It is therefore not unusual to note that much of the prior art encompasses methods of gross stabilization rather than methods of fine stabilization. Prior art methods include those of dithering and of Zeeman splitting; both these methods will maintain a frequency only within a certain tolerance.

Contrary to the prior art, the invention seeks to decrease the tolerance within which the frequency will be maintained. Additionally, the invention offers a solution to the problem of frequency stabilizing a laser placed in outer space for communication purposes.

Briefly, the invention may comprise a tunable laser in which is disposed a birefringent element to produce two orthogonally polarized but coincident output laser beams, a portion of which is sampled and directed to a polarization separating means such as a Wollaston prism, for example. The prism separates the two beams to provide two separate beams that are individually detected and compared as to amplitude to thereby provide an error signal that is coupled to the frequency adjusting portion of the tunable laser.

It is therefore an object of the invention to provide a frequency stabilized laser.

It is another object of the invention to provide alternate methods of stabilizing a laser.

It is still another object to provide an automatic, frequency stabilized laser to be used in outer space for communication purposes.

Other objects and many of the attendant advantages of this invention will be more readily appreciated as the same becomes better understood by reference to the following detailed description and considered in connection with the accompanying drawings in which like reference symbols designate like parts throughout the FIGS. thereof, and wherein:

FIG. 2A is a schematic representation of the laser's power output of its two principal frequency modes of oscillation when the laser is frequency stabilized, while

Figure 1:
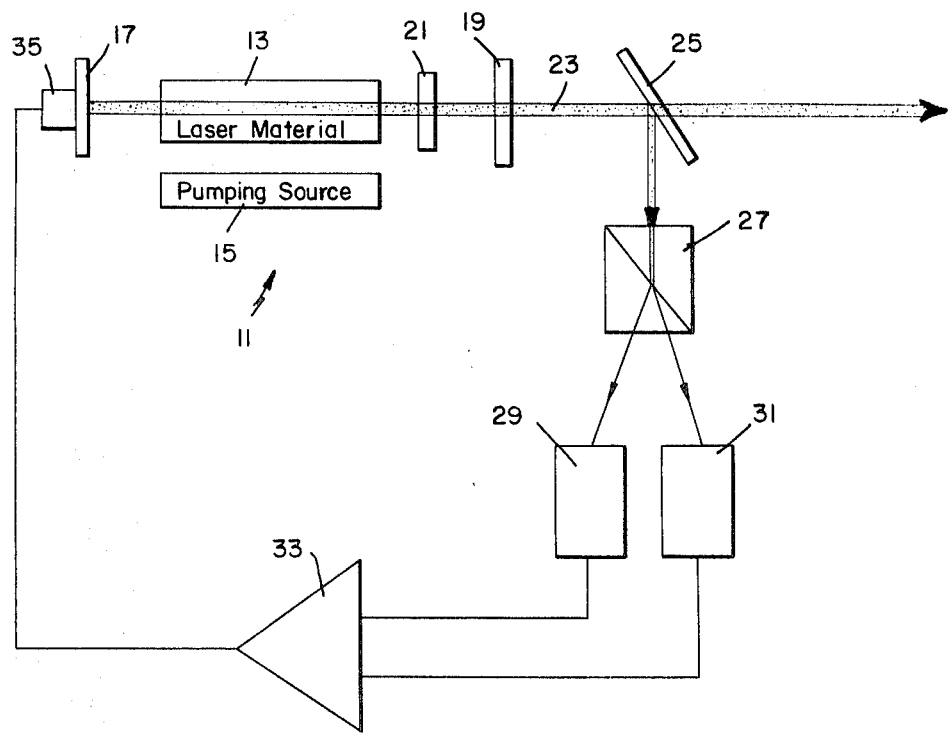
FIG. 1 is a schematic drawing of one embodiment of the invention which provides a frequency stabilized laser.

With reference to FIG. 1, there is shown a frequency stabilized laser 11 generally comprising an active laser element 13 pumped by a conventional source 15 and placed in a regenerative path between a pair of optically reflecting surfaces 17 and 19 which form the ends of a resonant cavity. A birefringent plate 21 is also placed within the resonant cavity in the resonant cavity to provide two coincidentally disposed, orthogonally polarized laser output beams having different frequencies of oscillation.

Outside the resonant cavity in the path of said beams is disposed a beam splitter 25 which acts as a power divider or coupler. The splitter 25 may take the form of a partially reflecting surface oriented at an angle of 45° with respect to the incident beams to allow a portion of the laser output to be reflected to a polarization discriminating beam separator element such as a Wollaston prism 27.

The prism 27 separates the two differently polarized energies into two beams, each of which is detected by a different optical frequency detector 29 and 31. After detection, the optical power of each of the detected beams is compared by coupling the outputs of the detectors 29 and 31 to a comparator amplifier 33 which in turn provides a difference or error signal that is coupled to a frequency adjusting element 35 of the laser 11. This element may be a piezoelectric device attached to an outer surface of the end mirror 17, for example.

The active laser element 13 may comprise any known substance which exhibits lasing action to provide coherent light along the regenerative path provided between the reflecting surfaces making up the resonant cavity. This active material may comprise a solid or a gas, e.g. ruby crystal or a carbon dioxide gas. Also, the pumping source 15 may comprise any source of energy which is capable of exciting the molecules or ions in the active element 13 to a lasing state and need not be an optical pump as indicated in the drawing but can be any other type of pump source suitable for exciting the particular laser material used. In other words, the pumping source 15 is a source of energy which is capable of establishing the necessary inverted population density condition in the active element 13. Examples of such pumping sources are means for providing a radiofrequency field, a xenon flash tube or any other suitable type of energy source.

Figure 2A:
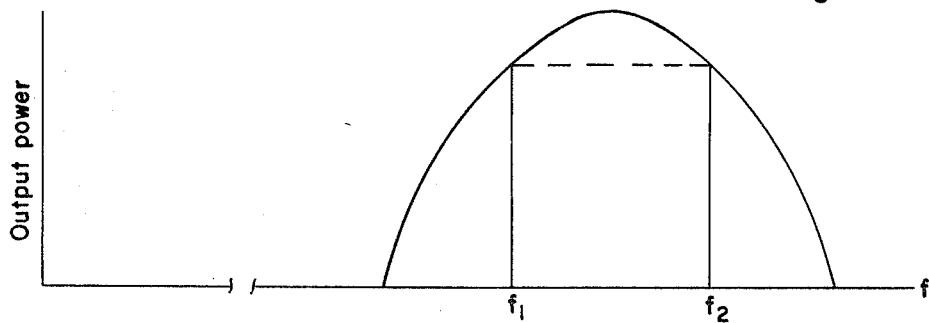
Figure 2B:
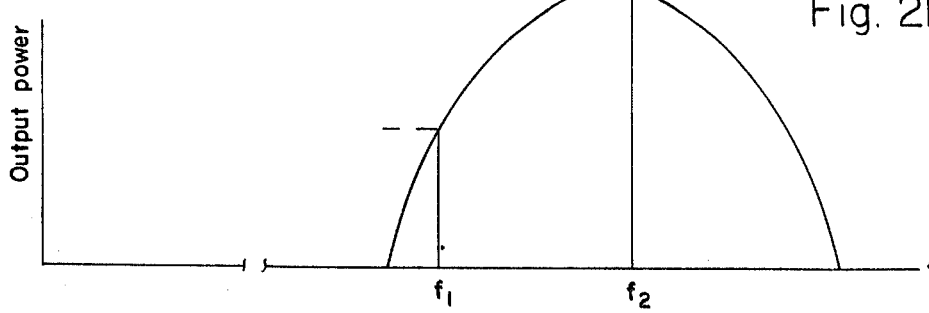
FIG. 2B and FIG. 2C are schematic representations of the laser's power output of its two principal frequency modes of oscillation when the frequency of the laser decreases and increases, respectively.
Figure 2C:
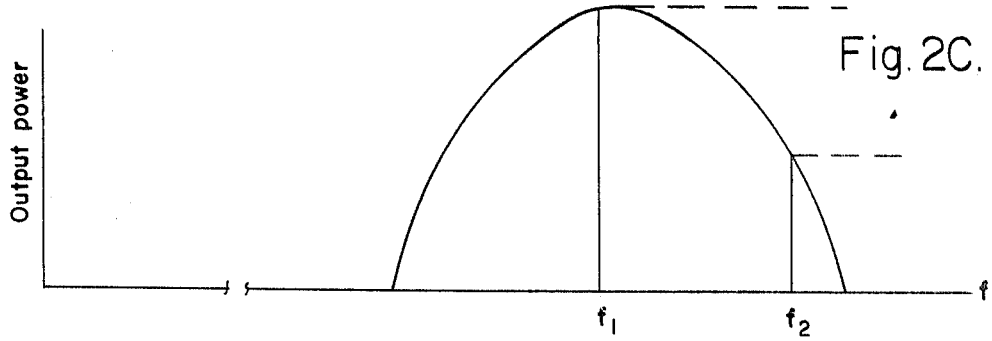

In FIG. 2A, the power output of the two orthogonal modes of the frequency stabilized laser of FIG. 1 are shown to be equal. This is the case where the laser is oscillating at a predetermined frequency and no error signal is developed. As the frequency of the laser starts to drift, the power output of the two modes becomes unequal as shown in FIG. 2B for a decreasing frequency shift and in FIG. 2C for an increasing frequency shift.

These two modes result from the action of the birefringent plate 21 placed in the regenerative path within the laser 11. This birefringent element provides the two orthogonal polarized beams having different frequency modes of oscillation. The different frequency modes arise due to the characteristic of this material to exhibit a different index of refraction for orthogonal polarizations to cause the length of the regenerative path to change for each polarization.

The frequency of oscillation of a laser is dominated by the particular characteristics of the active laser material, i.e. for the carbon dioxide gas laser the frequency of oscillation is about $3 \times 10^{13}$ c.p.s. Additionally, the frequency of oscillation must occur within the Doppler line width in order to be maintained. However, once these criteria have been met, the frequency modes of oscillation depend on the cavity path length according to the relation $f = nc/2L$ where $c$ = speed of light, $L$ = effective path length, and $n$ is the mode, i.e. $cn/2L_1$ is frequency $f_1$; while $nc/2L_2$ is frequency of refraction $f_2$, where effective path length is calculated in terms of the index.

Figure 3:
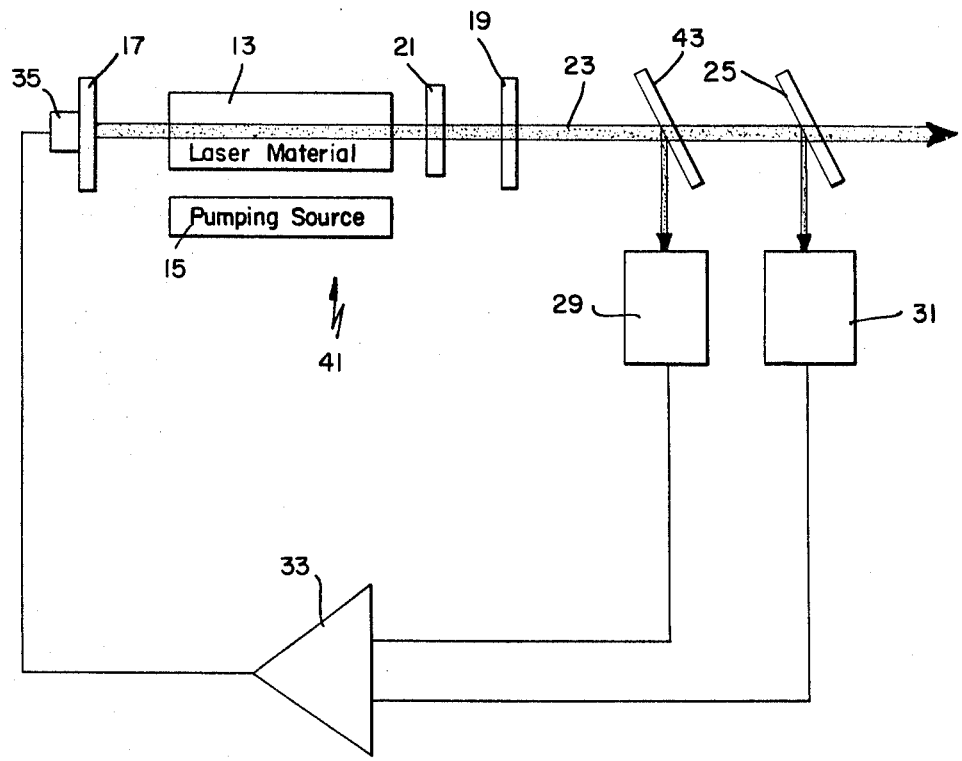
FIG. 3 is a schematic drawing of another embodiment of the invention which also provides a frequency stabilized laser.

Another embodiment of the invention provides a frequency stabilized laser 41 shown in FIG. 3 which includes the same elements as those shown in FIG. 1 with the exception that the Wollaston prism 27 has been replaced by a Brewster window 43. The Brewster window is placed between the output mirror 19 and the beam splitter 25 in order that it may reflect out one of the two orthogonally polarized beams. The other beam travels through the Brewster window 43 to the beam splitter 25 which appropriately divides the beam. The photodetector 29 is optically coupled to the Brewster window 43, while the other photodetector 31 is optically coupled to the beam splitter 25. The output powers from the two photodetectors 29 and 31 are amplified by the comparator amplifier 33 which drives the frequency adjustment element 35.

From the foregoing, it can be seen that there have been described two laser systems in which frequency stabilization has been automatically accomplished for both.

Although specific embodiments have been herein described, it will be appreciated that other organizations of the specific arrangement shown may be made within the spirit and scope of the invention. For example, the active laser material may be any material exhibiting laser action, and the location and arrangement of the various elements of the frequency stabilized laser in FIGS. 1 and 3 may be other than that shown. Furthermore, it should be noted that the sketches in various FIGS. are not drawn to scale and that the distances of and between various FIGS. are not to be considered significant. As set forth previously, other components similar in function may be substituted for the components shown in the drawings.

Accordingly, it is intended that the foregoing disclosure and the showing made in the drawings shall be considered only as illustrations of the principles of this invention and are not to be construed in a limiting sense.

I claim:
1. A frequency stabilized laser comprising:
a laser regenerative cavity including end reflectors defining a regenerative path therebetween and including output means for providing output laser energy;
frequency adjusting means coupled to said regenerative cavity for adjusting the frequency of the laser;
active laser material disposed within said laser cavity in said regenerative path;
pumping means coupled to said laser material for producing pump energy to excite said laser material to a lasing state;
birefringent means disposed within said laser cavity in said regenerative path for providing two orthogonally polarized laser output beam portions having different frequencies of oscillation;
polarization separating means optically coupled to said two output beam portions for separating at least respective portions of said beam portions into two laser output beams traversing different paths and having said different frequencies of oscillation, and wherein said polarization separating means is a Brewster window arranged so as to reflect one of said beam portions along a first path and transmit the other of said beam portions along a second path; and
detection and comparison means optically coupled to each of said laser output beams for determining the relative amplitude of said output beams and for providing an error signal that is coupled to said frequency adjusting means to adjust the frequency of said output laser energy accordingly.